United States Patent [19]

Walker

[11] 4,124,157

[45] Nov. 7, 1978

[54] BRAZING FIXTURE

[75] Inventor: Robert L. Walker, Vancouver, Wash.

[73] Assignee: Pacific Saw & Knife Company, Portland, Oreg.

[21] Appl. No.: 806,052

[22] Filed: Jun. 13, 1977

[51] Int. Cl.² .............................................. B23D 65/00
[52] U.S. Cl. ..................................... 228/49; 76/25 R; 76/79
[58] Field of Search ................. 228/6 R, 49 R, 44.1 R; 76/25 R, 74, 79, 101 A, 112

[56] References Cited

U.S. PATENT DOCUMENTS

| 2,642,758 | 6/1953 | Styles | 76/79 |
| 2,673,279 | 3/1954 | Drake | 228/6 R X |
| 2,823,295 | 2/1958 | Wilcox | 219/78 |
| 3,613,211 | 10/1971 | Daggett | 228/49 R X |

FOREIGN PATENT DOCUMENTS 394,187  1/1974  U.S.S.R. .............................. 228/44.1 R

Primary Examiner—Al Lawrence Smith
Assistant Examiner—K. J. Ramsey
Attorney, Agent, or Firm—Klarquist, Sparkman, Campbell, Leigh, Hall & Whinston

[57] ABSTRACT

A tipping fixture for circular saw blades in which a tip supporter and a saw supporter are mounted for relative adjustment toward and away from one another, and for relative vertical adjustment to facilitate brazing a tip to a tooth held in a stable position on the saw support.

6 Claims, 7 Drawing Figures

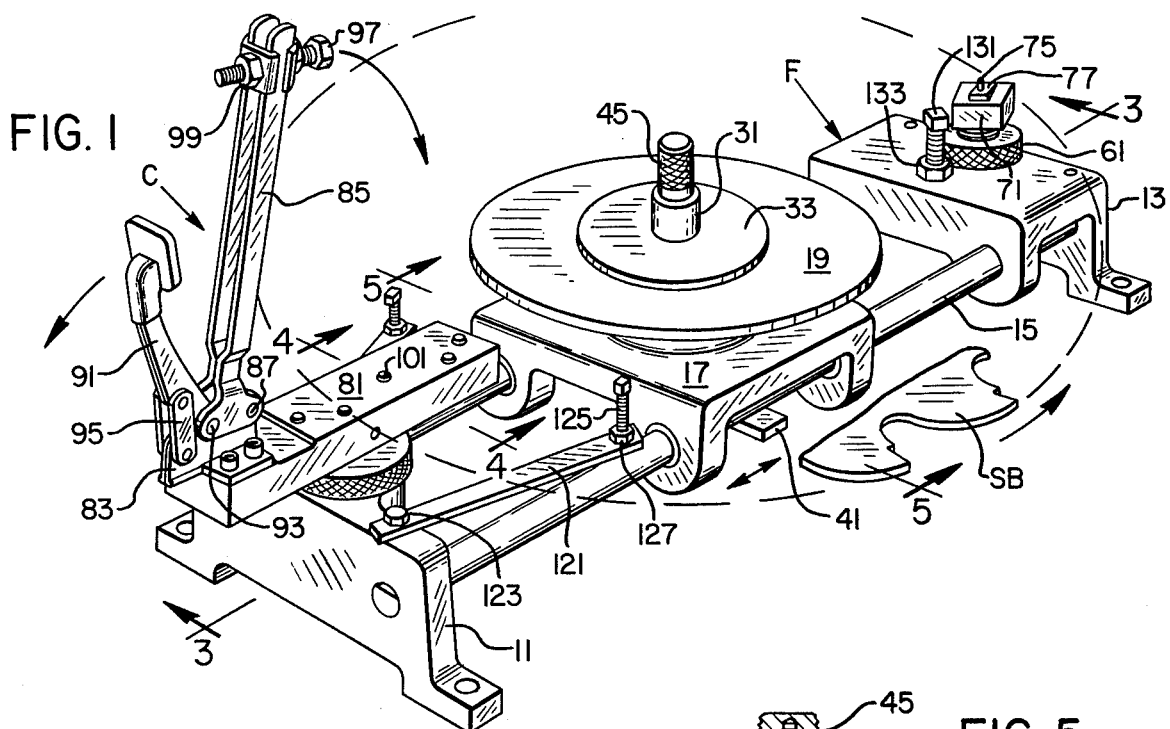
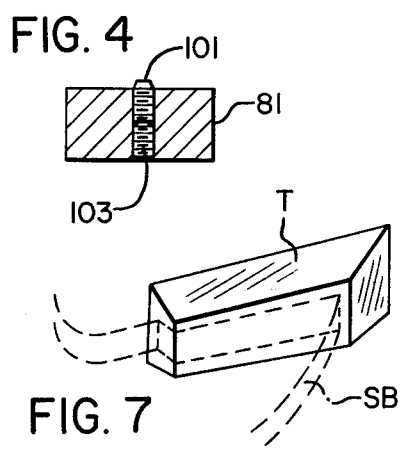
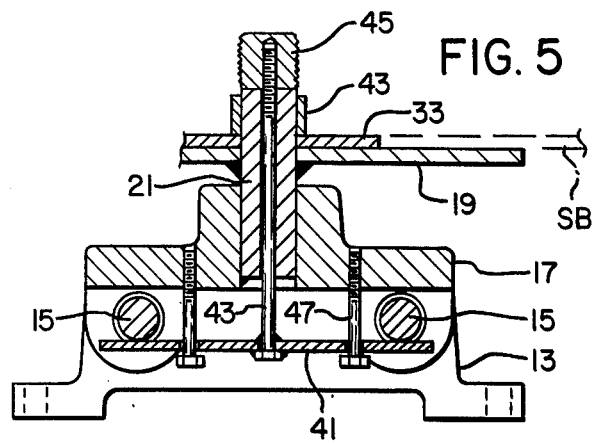
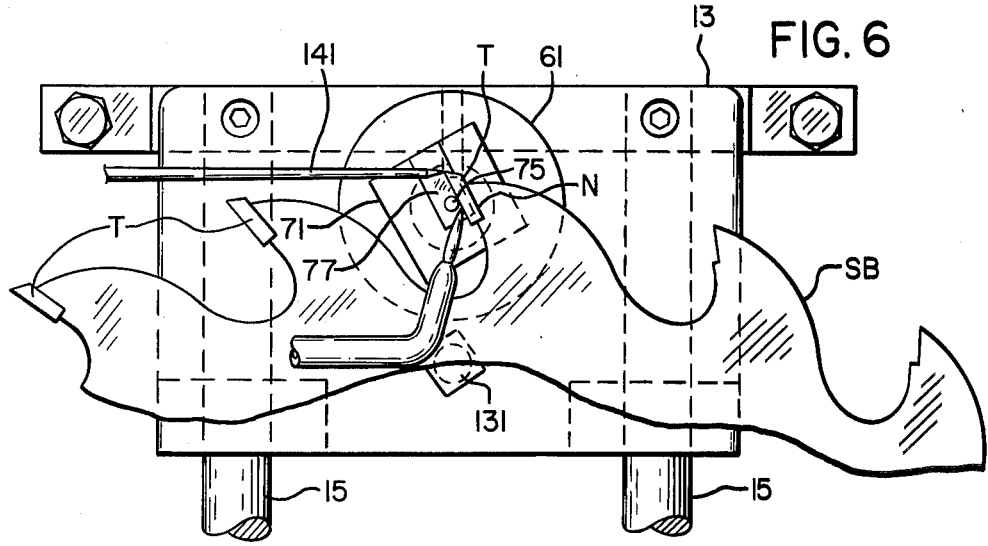

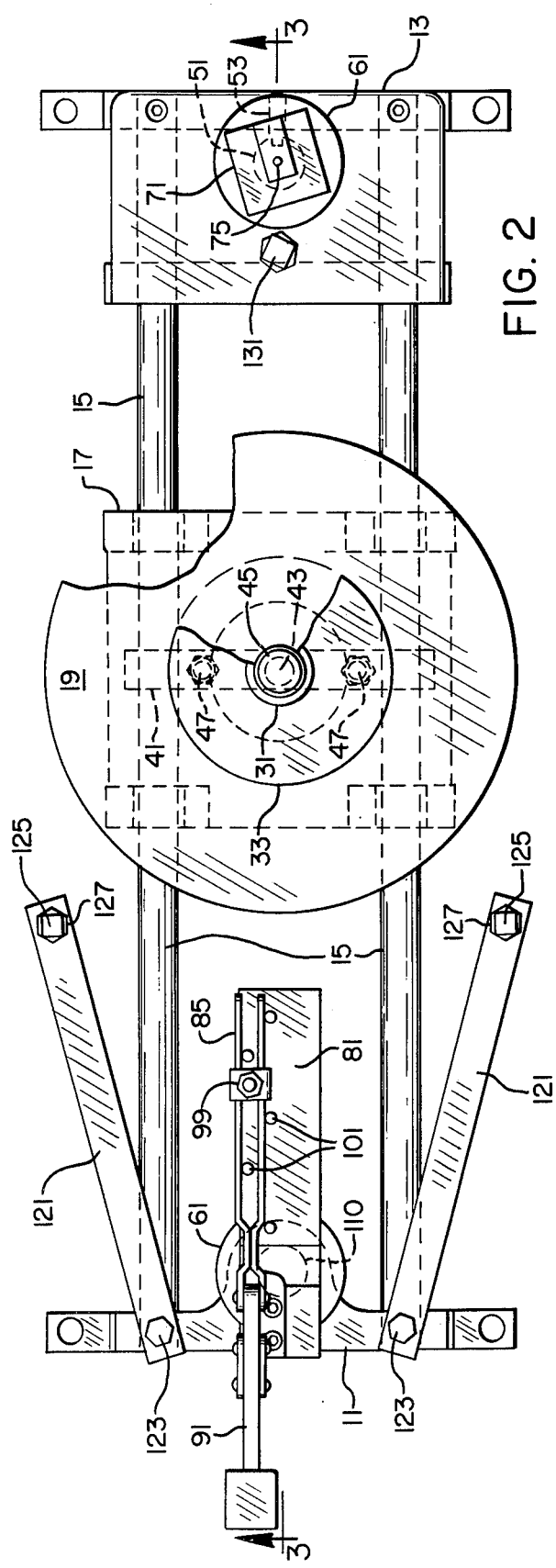
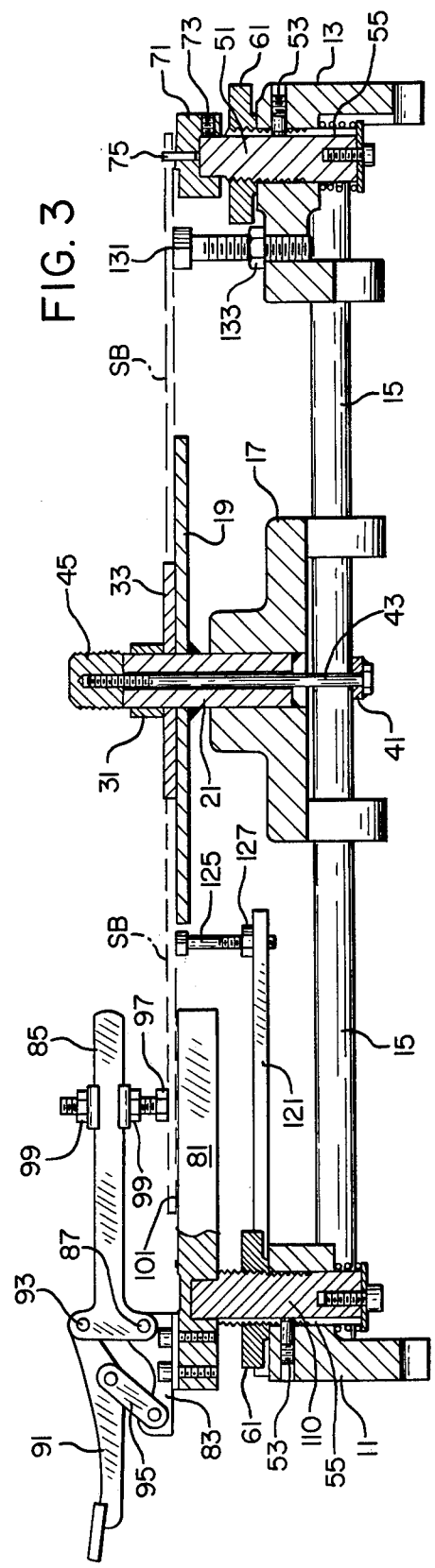

BRAZING FIXTURE

BACKGROUND OF THE INVENTION

Before my development, tipping circular saws was a time-consuming operation because of the number of adjustments in position necessary to accurately locate a tip next to a tooth.

SUMMARY OF THE INVENTION

My inventive mechanism readily accurately and stably supports the saw and tip for the brazing operation.

An object is to provide a mechanism to accomplish these purposes, particularly with saws of different diameters and thicknesses, and with different sizes of tips.

Various other objects of the invention will be apparent from the following description taken in connection with the accompanying drawings, wherein:

FIG. 1 is a perspective view of a tipping fixture of the present invention;

FIG. 2 is a plan view of the tipping fixture;

FIG. 3 is a vertical longitudinal midsectional view of the fixture taken along line 3—3 of FIG. 2;

FIG. 4 is a vertical cross sectional view taken along line 4—4 of FIG. 1;

FIG. 5 is a vertical cross sectional view taken along line 5—5 of FIG. 1;

FIG. 6 is a plan view showing a tip being brazed in place;

FIG. 7 is a perspective view of a tip in relation to a tooth.

Referring to FIG. 1, the fixture includes an elongate frame F which is made up of a pair of end standards 11 and 13, which are joined in spaced relation by a pair of parallel guide rods 15. The carriage 17 is slidably mounted on the guide rods for movement therealong.

A saw blade support table 19 includes an upstanding center arbor 21 (FIGS. 1 and 5) projecting into and fixedly secured to the saw carriage 17. A bushing 31, in the form of a flanged collar, slidably fits onto said arbor 21. The flanged portion 33 of the bushing is of a diameter to fit the eye of a circular saw blade to center the saw blade on said arbor. The arbor and the eye constitute a saw blade centering means.

A locking mechanism is provided for the carriage to releasably lock it in varying positions of adjustment upon the guide rods. As best shown in FIG. 5, the mechanism includes an inverted T member made up of a cross piece 41 underlying the guide rods, and an upright bolt 43 secured to the center of the cross piece. The bolt extends upwardly through a central bore in the arbor 21 and threads into a knurled nut 45. A pair of depending bolts 47 loosely pass through the cross piece 41 and maintain it in a crosswise relation to the guide rods at all times. The depending bolts 47 will also serve to support the cross piece in the event the knurled nut is removed from the bolt 43.

In use, assuming that the nut 45 is loose, this releases any clamping pressure on the cross piece 41 against the guide rods 15 and permits the carriage 17 to be moved along the guide rods to a desired position of adjustment. Then the knurled nut 45 is tightened to draw the cross piece 41 upwardly against the guide rods 15 in clamping relationship to lock the carriage against movement relative to the guide rods.

A tip support means is provided on one end of the frame at the standard 13, and as shown in FIG. 3 comprises an elevator shaft 51 which is formed with micrometer threads. The shaft fits through a vertical bore formed in the standard 13. A keying screw 53 on the standard fits in a keyway 55 on the shaft to prevent turning movement of the shaft relative to the standard, but allows vertical movement of the elevator shaft relative to the standard.

A knurled adjusting nut 61 is threadedly mounted on the upper portion of the elevator shaft 51. A compression spring 63 on the lower portion of the shaft pulls the shaft downwardly to bring the nut against the upper surface of the standard 13. The spring is retained between the lower surface of the standard 13 and a washer and nut 65 on the bottom of the shaft.

A tip support in the form of a laying block 71 has a socket to fit on the upper plain end of the elevator shaft 51 and is fixedly, but replaceably, secured on the shaft by a setscrew 73. The block has an upright, generally centrally disposed laying or locator pin 75, and if the tip to be attached is tapered from end to end, the block will be provided with a ramp 77 (compare FIGS. 2 and 3) for supporting the tip in a level condition relative to a saw blade.

Standard 11 carries a saw clamp C (FIG. 1) which includes a horizontal base member 81 and toggle type clamping structure. The latter includes a support member 83 mounted on the outer end of the base member 81, and also includes a swinging arm 85 pivoted at 87 on the support member 83. The toggle type clamping structure further includes a toggle arm 91 pivotally connected at 93 to the swinging arm and pivotally connected by links 95 to the support member 83.

The free end of the swinging arm 85 carries a hold down element in the form of a bolt 97 threadedly passing through the free end of the swinging arm and releasably held in any desired position of adjustment by jam nut 99.

The base member 81 has a series of saw blade rests 101 distributed over its face upon which the peripheral portion of a saw blade is supported. Each rest is in the form of a setscrew (FIG. 4) threaded into the block and held in a desired position of adjustment by a jam screw 103 threaded into the base member 81.

The base member 81 is mounted on the structure 11 by means of an elevator shaft 110 (FIG. 3) which is part of a vertical adjustng mechanism identical to the one described for block 71 on standard 13.

Additional support means are provided for large size saw blades and are in the form of a pair of support arms 121, each being pivotally mounted by a bolt 123 on the standard 11 and having at its inner end an upright saw rest in the form of a bolt 125 threaded into the free end of the associated arm. A jam nut 127 holds the saw rest bolt 125 in a desired position of adjustment relative to the arm 121.

At the opposite end of the fixture, there is a saw rest 131 in the form of a bolt threaded into the standard 13 and being held in any desired position of adjustment by a jam nut 133.

Saw rest 13 provides an auxiliary saw blade support means at the right hand end of the frame, as the parts are shown in FIG. 1, while the bolts 125 and screws 101 each provide an auxiliary saw blade support means at the left hand end of the frame.

OPERATION

With suitable straight edges, levels and other suitable tools, the saw rest 131 is vertically adjusted until the top surface is even with the top surface of the table 19. With similar tools, plural rests 101 on the base member 81 have the upper ends thereof disposed in the same plane, and by adjustment of the elevator shaft 110 such upper ends can be disposed even with the upper surface of the table 19. By similar adjustment, the upper ends of the saw rest 125 are arranged at the same level as the upper surface of the table 19.

Assume that a number of saw blades SB (FIG. 1) of the same size are to be tipped. One of the saw blades is mounted flatwise on the table 19, and a bushing having a flange of proper diameter is provided on the arbor to fit within the eye of the saw blade SB and center it in relation to arbor 21.

The knurled nut 45 is now loosended and the carriage 17 moved to a position to bring a tooth of the saw blade next to the locator pin 75, with the locator pin disposed about half way along the long edge of a saw tip notch N (FIG. 6) provided on the saw blade SB. The nut 45 is now tightened to releasably lock the carriage in the desired position.

To set the hook line of the saw the setscrew 73 is loosened and the laying block 71 turned until the ramp 77 is parallel to the long edge of the notch N (or to a tip T in the notch).

Next, the height of the laying block 71 is vertically adjusted to dispose the longitudinal central axis of the tip T coinciding with the midplane of the saw blade by suitable manipulation of the knurled nut 61 for the elevator shaft 51.

The tip of a pointer rod 141 is now pressed against the tip T (which preferably is pretinned) and flame from a torch 143 is applied to the tip to braze the tip to the tooth.

Now, the saw is rotated to bring the next tooth into register with the locator pin 75.

Typically, the tips T come with tangential clearance (end to end tapering) or may have radial clearance (width wise tapering) plus tangential clearance. FIG. 6 shows a tip having both types of clearances. If this is the case, the ramp will have its upper face inclined two ways relative to the upper face of the laying block so that the tip will be supported with its central longitudinal axis parallel to and coinciding with the midplane of the saw tooth to which it is to be brazed. In the event that the tip to be brazed has no clearance, then a laying block 71 without a ramp will be substituted for the one shown in FIG. 3.

What is claimed is:

1. A tipping fixture to facilitate the application of tips to circular saw blades, comprising:
    an elongate frame having horizontal guides,
    a tip support means on one end of said frame having a tip support,
    a saw blade supporting table for horizontally supporting a saw blade,
    a carriage supporting said table and mounted on said guides for sliding movement therealong to various positions of adjustment to properly locate the teeth of saw blades of various diameters at said tip support,
    saw blade centering means including an upright arbor mounted on said carriage and extending vertically through the eye in a saw blade,
    means extending through said arbor for releasably clamping said carriage at desired positions along said guides,
    and means for vertically adjusting said tip support to locate a tip properly relative to the midplane of a saw blade.

2. A tipping structure as recited in claim 1, wherein said arbor is fixedly secured to said carriage and table, and a bushing on said arbor to fit in the eye of the saw blade and center the same relative to the axis of said arbor.

3. A tipping fixture to facilitate the application of tips to circular saw blades, comprising:
    an elongate frame having horizontal guides,
    a tip support means on one end of said frame having a tip support,
    a saw blade supporting table for horizontally supporting a saw blade,
    a carriage supporting said table and mounted on said guides for sliding movement therealong to various positions of adjustment to properly locate the teeth of saw blades of various diameters at said tip support,
    means for releasably clamping said carriage in desired positions along said guides,
    means for vertically adjusting said tip support to locate a tip properly relative to the midplane of a saw blade,
    first auxiliarly saw blade support means on the other end of said frame and being vertically adjustable to provide a supporting surface in the same plane as that of the supporting surface of said table,
    said first auxiliary saw blade support means being adapted to contact saw blades of various diameters despite shifting movement of said carriage along said guide and relative to said first auxiliary saw blade support means,
    second auxiliary saw blade supporting means located on said one end of said frame and being vertically adjustable to provide a supporting surface in the same plane as that of the supporting surface of said table.

4. A tipping fixture as recited in claim 3 wherein said first auxiliarly saw blade support means includes a pair of arms pivotally mounted on said other end of said frame and having vertically adjustable upstanding saw blade supporting elements.

5. A tipping fixture as recited in claim 3 wherein said first auxiliary saw blade support means includes a clamp vertically adjustably mounted on said other end of said frame.

6. A tipping fixture to facilitate the application of tips to circular saw blades, comprising:
    an elongate frame having horizontal guides,
    a tip support means on one end of said frame having a tip support,
    a saw blade supporting table for horizontally supporting a saw blade,
    a carriage supporting said table and mounted on said guides for sliding movement therealong to various positions of adjustment to properly locate the teeth of saw blades of various diameters at said tip support,
    said tip support means including an elevator shaft mounted on said one end of said frame,
    keying means to prevent rotary movement of said elevator shaft but permitting vertical movement of the same,
    means threadedly engaging said elevator shaft for effecting vertical movement of said elevator shaft to various positions of adjustment, a tip laying block mounted on the upper end of said elevator shaft,
said tip laying block having a ramp for supporting a tip,
said laying block having a rotatable fit on said shaft, and
means for adjustably securing said laying block in various positions of adjustment about the axis of said elevator shaft to properly orient said ramp at the proper angle relative to the particular hook line of the teeth of a saw blade to be tipped.

* * * * *